United States Patent [19]
Kosmiderski et al.

[11] 3,928,628
[45] Dec. 23, 1975

[54] PROCESS FOR THE PREPARATION OF A SEROLOGICAL CARRIER

[75] Inventors: Szymon Kosmiderski; Slaw Polak, both of Katowice, Poland

[73] Assignee: Wojewodzka Stacja Krwiodawstwa, Katowice, Poland

[22] Filed: June 27, 1973

[21] Appl. No.: 373,993

[30] Foreign Application Priority Data
July 6, 1972 Poland .............................. 156528

[52] U.S. Cl. ................ 424/366; 252/421; 252/444; 423/445; 423/460; 424/8; 424/11; 424/12; 424/13; 424/125
[51] Int. Cl.² ...................... C01B 31/14; C09C 1/44; G01N 31/00; G01N 33/16
[58] Field of Search ............ 252/421, 444; 423/450, 423/460, 445; 424/8, 11, 12, 13, 366, 125

[56] References Cited
UNITED STATES PATENTS
3,074,853  1/1963  Brewer.................................. 424/12

OTHER PUBLICATIONS

Herbert, Proc. Int. Sym. Protein & Polypeptide Hormones, May 1968, pub. Ex. Med. Found. 1969, pp. 55–60.

Primary Examiner—Albert T. Meyers
Assistant Examiner—A. P. Fagelson
Attorney, Agent, or Firm—Waters, Schwartz & Nissen

[57] ABSTRACT

The invention relates to a process for the preparation of a carrier particularly used in serological reactions, and to a carrier produced according to this process. The carrier consists of carbon comminuted to a grain size of 0.30–1.00 micron and suspended in a buffer having a pH-value of 8.2, preferably in a glycine buffer. The quantity of carbon suspended in the buffer should secure, when making the measurement on the spectrophotometer, a transparency of 10–15 percent. The obtained carbon suspension in a buffer having a pH-value of 8.2 is used in analytic reactions, particularly in serological ones.

5 Claims, No Drawings

PROCESS FOR THE PREPARATION OF A SEROLOGICAL CARRIER

The invention relates to a process for the preparation of a carrier particularly used in serological reactions.

The application of polystyrene molecules as the carrier in serological reactions is known. The drawback of the application of said carrier type consists in that polystyrene molecules are unable to be lyophilized, which is the reason why their storage time is limited.

Purpose of the invention is to eliminate the above inconveniences and to elaborate a method of preparing a carrier applicable in serological reactions and which could be lyophilized and stored for unlimited time.

The process for the preparation of a carrier being applicable particularly in serological reactions, according to the invention, consists of active carbon being burnt in aliphatic alcohol having 1–10 carbon atoms in the molecule, whereupon the product obtained, dry or wet, is ground up to a comminution of 0.30–1.00 micron. A suspension thereof in a buffer solution of a pH-value of 8.2, preferably in a glycine buffer solution, is produced having such a carbon content that when making the measurement on the spectrophotometer a transparency of 10–15 percent, preferably of 12.5 percent is obtained.

According to the method of the invention, the preferred alcohol is absolute ethyl alcohol. The glycine buffer solution which is used according to the invention method, shows a pH-value of 8.2 and contains 7.3 g of glycine, 9.0 g of NaCl, 2.5 g of NaOH and distilled water in a quantity completing up to 1000 ml.

The obtained suspension in a buffer solution having a pH-value of 8.2, preferably in a glycine buffer solution, may be used in analytic, advantageously serological reactions, particularly for covering with antigens or antibodies.

This suspension may advantageously be employed for carrying out serological test-tube reactions or quick glass slide reactions of the diagnostic latex type. The lyophilized Product can be stored for an unlimited time.

The examples stated below illustrate the object of the invention.

EXAMPLE I

Over active carbon in a quantity of 1 g a double quantity by weight of absolute ethyl alcohol is poured, whereupon the mixture is set on fire. After the alcohol is burnt, the product is ground in a ball mill until a comminution of 0.50 micron is obtained. Then, from the obtained ground carbon we prepare 100 ml of a suspension in an isotonic glycine solution having a pH-value of 8.2.

In order to obtain a finished product, the carbon quantity in the isotonic solution is chosen so that during the measurement on the spectrophotometer, with a wave length of 750 mm, a transparency of 12.5 percent is obtained.

For a longer storage, the product obtained is subjected to lyophilization.

The product thus prepared is used in diagnosis, advantageously in pregnancy diagnosis.

EXAMPLE II

One proceeds as stated in example I, but with the difference that for preparing the suspension we use ground carbon having a grain size of 1.0 micron.

The product thus prepared is used for diagnosis — advantageously for determining the presence of the rheumatoid factor.

We claim:

1. A process for the preparation of a carrier particularly used in serological reactions comprising burning active carbon in absolute alcohol, grinding the product obtained, and preparing a suspension in a buffer solution having a pH-value of 8.2.

2. The process of claim 1 wherein the alcohol is absolute ethyl alcohol.

3. The process of claim 1 wherein the suspension is lyophilized.

4. The process of claim 1 wherein the buffer is a glycine buffer solution.

5. The process of claim 4 wherein said buffer solution comprises 7.3 g. of glycine, 9.0 g. of NaCl, 2.5 g. of NaOH and distilled water up to 1000 ml.

* * * * *